June 16, 1936.  W. T. McGUIRE  2,044,315
ELEVATING ROAD GRADER
Filed Aug. 13, 1935  2 Sheets-Sheet 1

Inventor
William T. McGuire,
By Mawhinney & Mawhinney
Attorneys

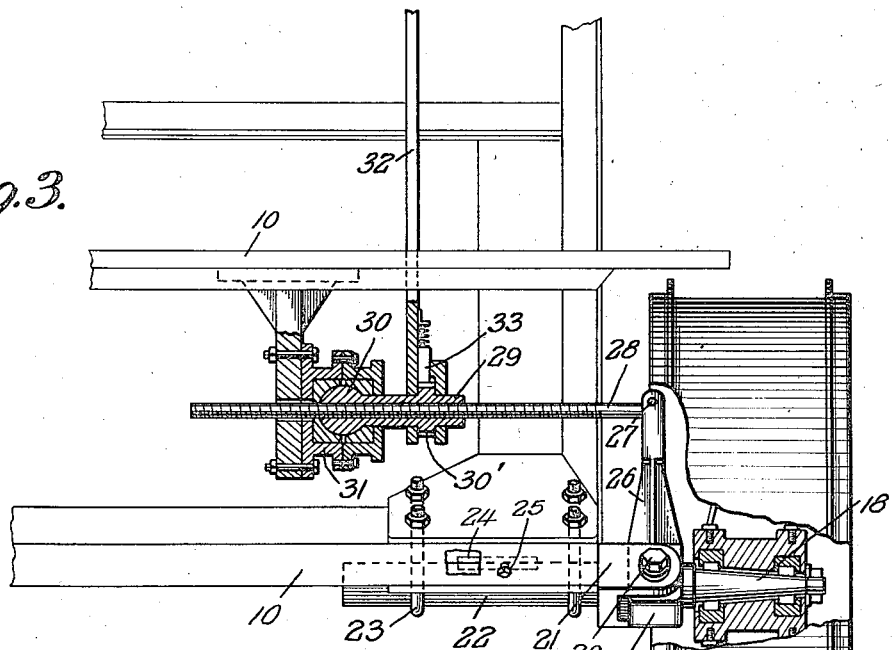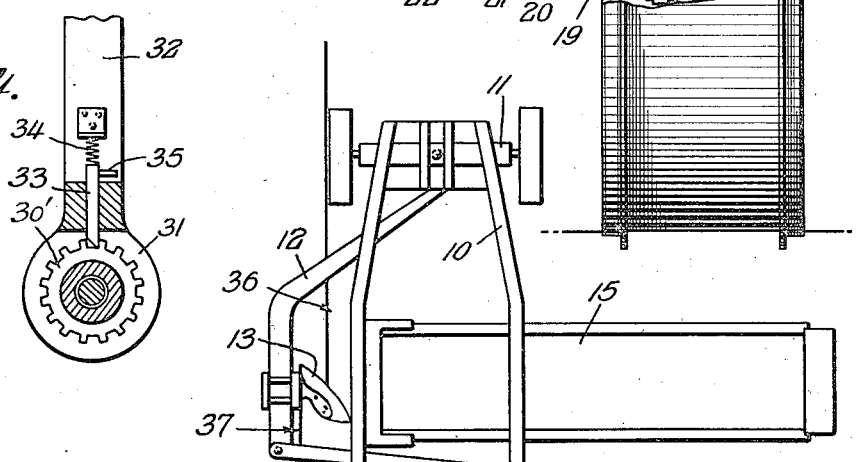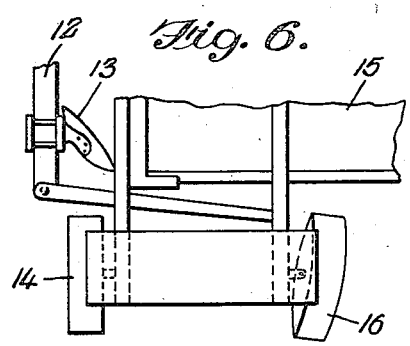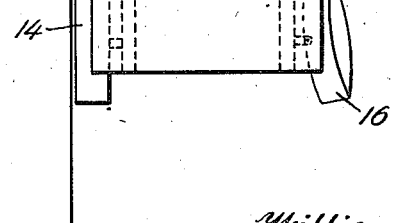

Patented June 16, 1936

2,044,315

UNITED STATES PATENT OFFICE 2,044,315

ELEVATING ROAD GRADER

William T. McGuire, Algona, Iowa

Application August 13, 1935, Serial No. 36,012

4 Claims. (Cl. 37—110)

The present invention relates to elevating road graders, and has for an object to provide means for controlling the rear end of the grader and controlling the pressure of the plow against the wall of the furrow.

Another object of the invention is to provide a practical and simple construction of means for accomplishing this purpose wherein advantage is taken of the weight imposed upon the rear right wheel of elevating road graders having the plow beneath the left side of the frame so that the weight of the elevator in addition to the weight of the frame of the machine is utilized to hold the rear right wheel to the ground.

Another object of the invention is to provide an elevating road grader of the type having a plow beneath the left side of the frame with a furrow wheel disposed immediately in rear of the plow and which has a smooth tread and to provide an opposite or right rear wheel with means for not only swinging the spindle of the wheel forwardly and backwardly but so mounting the spindle that such adjustment will also effect the toeing inwardly or outwardly of the wheel with respect to the line of draft so as to hold the rear end of the grader and the plow in correct position and alinement and with the desired pressure of the plow against the wall of the furrow being cut.

Another object of the invention is to provide an improved and simplified means for mounting a wheel spindle with its pivot inclined forwardly at a suitable angle and with an arm on the spindle and improved adjusting and holding means connected to the arm so that the arm may be swung into various desired angles and held in such position for swinging and supporting the spindle at the desired forward inclination and tilt from the horizontal axis of the axle of the machine.

Another object of the invention is to provide in an elevating grader the combination of the frame with its plow at the left side, an adjustable master wheel on the right rear portion of the frame and a fixed furrow wheel on a fixed axle mounted on the left side of the frame behind the plow, the fixed axle holding the furrow wheel stationary, as any change in the height or angle of the furrow wheel would throw out all adjustments of the plow and lower end of the elevator and adjacent parts of the machine as they are suspended from the left side of the frame, and throw the entire machine out of order.

A further object is to provide a master wheel control device which may be economically manufactured and installed on the grader, and which may be quickly and easily adjusted during use of the machine.

A further object of the invention is to provide a control means of this character wherein the machine is held steady in the desired position during cutting and wherein the width of the furrow is controlled by maintaining the lateral position of the plow and rear end of the frame in correct position to accomplish this purpose.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a rear elevation of an elevating road grader equipped with controlling devices constructed and mounted according to this invention.

Figure 3 is a fragmentary enlarged rear elevation, partly in section, of the rear right end of the machine, showing the adjusting and holding means for the wheel spindle.

Figure 4 is a detail transverse section taken through the adjusting lever and the adjacent parts.

Figure 5 is a diagrammatic plan view of the elevating grader showing the relation between the plow, furrow wheel and the master wheel, and Figure 6 is a fragmentary plan view of the same showing the master wheel adjusted in an opposite direction from that shown in Figure 5.

Figure 1:
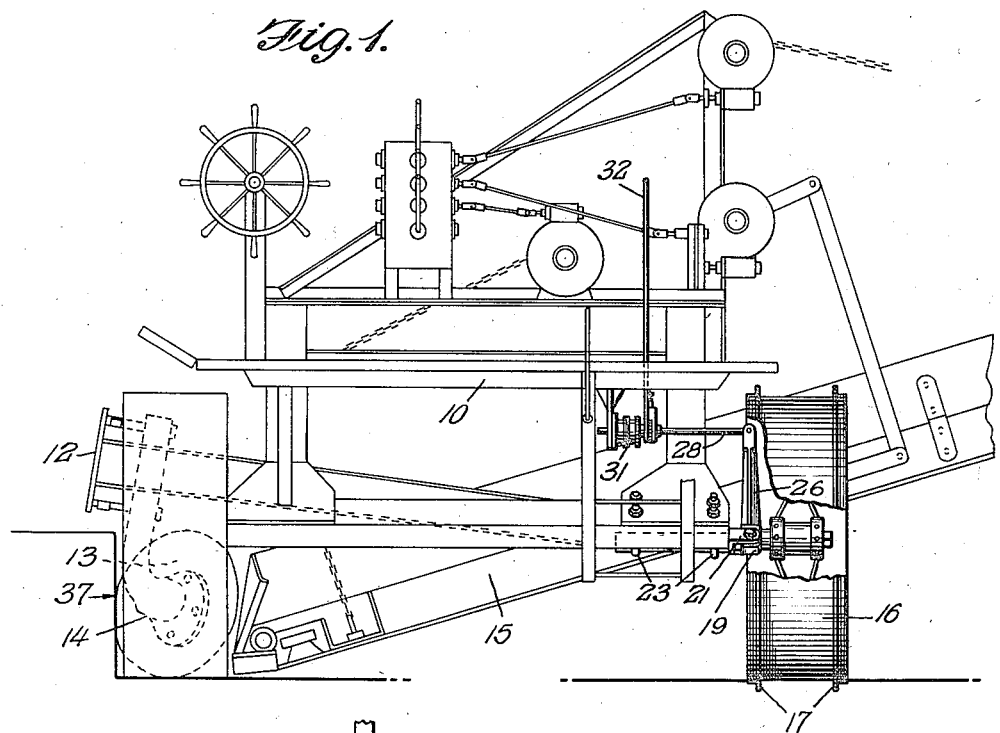

Referring now to the drawings, 10 designates generally the frame structure of the machine with its various brackets and projections. The forward end of the frame is supported in any suitable manner, such as by a front axle and wheel structure 11, as shown in Figure 5, and the frame is provided therebetween with a suitably connected and suspended plow beam 12 from which is adjustably suspended a plow 13. The plow 13 may be of any desired type and is shown in the present instance as of the disc type and projects a sufficient distance beyond the left side of the machine to engage the wall of a furrow to be cut, and the frame 10 is provided at its rear left end with a furrow wheel 14 of suitable construction to trail or track behind the plow 13.

Supported beneath the frame 10 and projecting laterally from the right side thereof is an elevator 15 of any suitable type and which extends upwardly from a point adjacent the plow beneath the frame 10. The elevator 15 may extend to any suitable distance beyond the right side of the frame in the usual manner.

According to the present invention the frame 10 is provided at its right rear end with a master or control wheel 16 which is preferably provided with a pair of tread rings 17 disposed adjacent the opposite edges of the rim of the wheel to insure that the wheel will track properly and will not readily skid in a lateral direction. The wheel 16 is mounted upon a spindle 18 having a head or block 19 at its inner end which is pivotally supported upon a pivot pin 20, the pin 20 may be in the nature of a bolt or other suitable device of sufficient strength and desired construction for accomplishing the purpose. The pin 20 is carried through the spaced arms of a fork 21 carried on the outer end of an axle 22 which may be of the stub or other suitable type and which is held to the frame 10 by any suitable means. The axle 22 may be clamped into the boxing of the frame 10, as shown in Figure 3, by U-bolts 23 or the like and a locking key 24 is disposed between the axle and the housing for holding the axle against turning. The relation between the key 24, the axle 22 and the fork 21 is such that the latter is rigidly held at a forward inclination of any desired angle, such as for instance 30°, but this degree of inclination may, of course, be varied according to circumstances found in the construction and operation of the machine.

Figure 2:
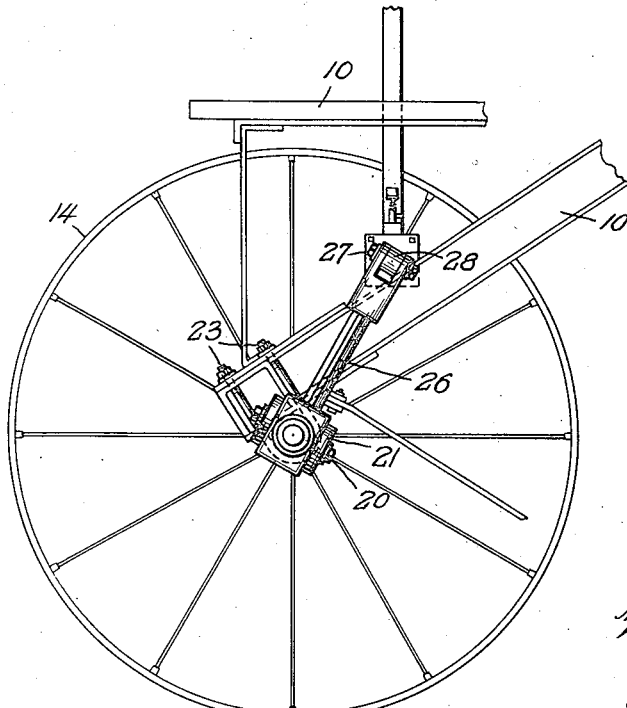
Figure 2 is a fragmentary enlarged side elevation of the rear right end of the machine, showing the forward tilt of the spindle pivot and the relative positions of the adjacent parts.

The pivot 20 therefore is supported at a forward inclination as shown in Figure 2, so that when the spindle 18 is swung upon the pivot 21 it moves through a plane which is inclined forwardly to the vertical and consequently an upward movement of the spindle 18 also effects a slight forward movement thereof.

The axle 22 may be held from longitudinal shifting in the boxing or frame 10 by a set screw 25, or other suitable means, so that the fork 21 is held not only from turning but also against lateral displacement during operation of the machine.

The block or head 19 of the spindle 18 carries an upwardly and forwardly inclined arm 26 which may be disposed at right angles to the axis of the spindle 18, as shown, or otherwise as is found expedient. Pivotally connected by a pin 27 to the upper end of the arm 26 is a rod 28 which extends inwardly of the frame 10 and may be threaded throughout its entire length. The rod 28 passes in threaded engagement through a sleeve 29 having a ball head 30 upon its inner end supported in a suitable boxing 31 bolted or otherwise suitably secured to the frame 10 and adapted to take up longitudinal thrust of the rod 28 in either direction.

The sleeve 29 is provided with a ratchet wheel 30', shown in Figure 4, preferably having square faced teeth and the ratchet wheel 30' is fixed to the sleeve 29 and carries thereabout the inner end 31 of an operating lever 32. The lever 32 carries a reversible dog 33 urged toward the ratchet wheel 30' by a spring 34 and is provided with a finger 35 at one side of the dog 31 by means of which the latter may be reversed in position for operating the ratchet wheel and the sleeve 29 in the desired direction.

The sleeve may be thus turned in either direction so as to move the rod 28 inwardly or outwardly with respect to the frame 10 and boxing 31, and the ball head 30 takes up thrust in opposite directions to counteract the thrust of the rod 28.

In operation, and referring particularly to Figures 5 and 6, when the machine is moved forwardly the plow 13 cuts into the exposed wall 36 of the last cut furrow and cuts the same back to a more or less extent to form the new cut furrow wall 37. The wheel 14 travels behind the plow 13 with a slight clearance between the wheel and the wall 37, and the dirt cut by the plow 13 is deflected onto the lower end of the elevator 15.

When the machine is operating on the side of a hill with the furrow wheel 14 at a higher elevation than that of the master wheel 16, the latter may be adjusted as shown in Figure 5 with the master wheel 16 tilted inwardly at its top and toed inwardly at its front. The extent of this adjustment of course is regulated by the rod 28 and the mechanism connected therewith so that the rear end of the machine is held to line during the operation of the plow 13. This master wheel 16 thus offsets tendency for the machine to creep downwardly away from the wall of the furrow.

With reference now to Figure 6, the master wheel 16 is adjusted to take care of a reverse relation of the machine with the side of a hill and wherein the master wheel 16 is higher than the furrow wheel 14.

In this instance the master wheel is toed outwardly at its forward end and tilted outwardly at its top. This adjustment is accomplished by swinging the arm 26 of the spindle outwardly as the spindle 18 will thus be not only swung down but also on the tilted pin 20 which will impart a rotary swinging movement also to the spindle 18.

It is obvious that various changes and modifications may be made in the details of construction and design of the above specifically described embodiment of this invention without departing from the spirit thereof, such changes and modifications being restricted only by the scope of the following claims.

What is claimed is:—

1. In an elevating road grader, a frame, a plow mounted beneath the left side of the frame for cutting the wall of a furrow, a furrow wheel on the frame behind the plow, an axle having a fork on its end tilted forwardly at an angle to the vertical, a spindle pivoted in the fork and having an arm for swinging the spindle in a plane inclined to the vertical plane of the axle, adjusting means connected to the arm, and a master wheel on the spindle.

2. In an elevating road grader, a frame, a plow mounted beneath the left side of the frame for cutting the wall of a furrow, a furrow wheel on the frame behind the plow, an axle on the frame having a fork turned axially on an angle to the vertical plane of the axle, a spindle pivoted in the fork and having an arm for swinging the spindle forwardly and upwardly and rearwardly and downwardly, a master wheel on the spindle, and adjusting means connected to the arm for tilting the top and front of the wheel inwardly in one adjustment and outwardly in another adjustment.

3. An axle on a frame having a fork tilted thereon axially forward, a spindle pivoted in the tilted fork and having an adjusting arm, a master wheel on the spindle, a rod pivoted to the arm, and a combined adjusting means and thrust take up device connected to the rod for moving and holding the same in adjusted position to dispose the master wheel at the desired tilt and toed position on the frame.

4. An axle on a frame having a fork axially tilted in a forward direction, a spindle pivoted in the fork and having a forwardly and upwardly inclined arm, a master wheel on the spindle, a threaded rod pivoted at one end to the arm and extending into the frame, a sleeve threaded on the rod and having a thrust ball on its end, a boxing carried by the frame and enclosing the ball to hold the same and the rod against longitudinal movement, and a ratchet lever connected to the sleeve for turning the same to adjust the master wheel into various diagonally tilted positions.

WILLIAM T. McGUIRE.